Nov. 11, 1969 R. E. LEE ET AL 3,477,099

EXTRUSION APPARATUS

Original Filed Aug. 19, 1965

INVENTORS.
Robert E. Lee
BY Harold J. Donald

AGENT

United States Patent Office 3,477,099
Patented Nov. 11, 1969

3,477,099
EXTRUSION APPARATUS
Robert E. Lee and Harold J. Donald, Midland, Mich., assignors to The Dow Chemical Company, Midland, Mich., a corporation of Delaware
Original application Aug. 19, 1965, Ser. No. 481,016. Divided and this application Dec. 21, 1967, Ser. No. 709,513
Int. Cl. B29f 3/02; B29c 11/00
U.S. Cl. 18—13                                     7 Claims

ABSTRACT OF THE DISCLOSURE

Corrosive polymers such as vinylidene chloride polymers are extruded in a multilayer structure by encapsulating the corrosive material within a stream of non-corrosive material and subsequently shaping the stream to a film or sheet. Only a relatively small part of the extrusion equipment need be made from corrosion resistant materials.

---

This application is a divisional application of our co-pending application Ser. No. 481,016, filed Aug. 19, 1965.

This invention relates to an improved extrusion apparatus and, more particularly, relates to an improved apparatus for the coextrusion of materials which are difficult to extrude.

Oftentimes it is desirable to prepare a multi-layer film or sheet composed of a plurality of adhering layers of diverse, synthetic, resinous materials. Such multi-layer sheets or films are prepared by a variety of means. Oftentimes it is desirable to employ as one or more of the inner layers a resinous composition containing a relatively high proportion of halogen, such as the vinylidene-vinyl chloride copolymers, vinylidene-acrylonitrile copolymers and the like polymeric materials containing high proportions of vinylidene chloride copolymerized therein. Such polymers are generically known as sarans. Other difficultly extrudable polymers having high moisture vapor barrier characteristics as well as gas barrier properties frequently are desirable. Usually, such barrier materials are difficult to extrude into a desired form and it is necessary oftentimes to add plasticizers and lubricants which detract from the desired barrier characteristics in order to obtain the flow characteristics necessary to permit extrusion into a desired configuration.

Beneficially, in many cases it is desired to provide a composite film or sheet structure wherein a barrier layer of a halogenated resin is centrally disposed between layers of a polyolefin resin. Generally the adhesion characteristics of the polyolefin resin to the barrier layer oftentimes are less than desired. Further in the extrusion of halogenated materials, such as sarans, special corrosion-resistant alloys must be used for the extruder and dies in order to prevent undesired decomposition of the resin and corrosion of the equipment.

It would be desirable if there were available an apparatus for the extrusion of multi-layer film or sheet which would permit the use of a maximum amount of conventional extrusion equipment suitable for polyolefins and a minimum amount of extrusion equipment designed for the corrosive halogenated materials.

It would also be desirable if such an apparatus were available which would permit the ready inclusion of desired quantities of adhesion-promoting agent adapted to bond the polyolefin to a centrally disposed carrier layer of a halogenated polymer. It would also be advantageous if such an apparatus were adapted to produce a product having desired dimensional relationship between the various layers thereof.

These benefits and other advantages in accordance with the present invention are achieved in an extrusion apparatus comprising in cooperative combination means to supply a first stream of a heat-plastified, thermoplastic material, means to supply a second stream of a heat-plastified, thermoplastic, resinous material, means to supply a third stream of a heat-plastified, thermoplastic resinous material, a die defining an internal cavity and an extrusion orifice, the extrusion orifice having a generally elongated configuration and adapted to extrude a sheet therefrom, a first conduit, a second conduit, and a third conduit, the first conduit providing communication between the first stream supply means and the cavity of the die, the second conduit providing communication between the second supply means and the internal cavity of the die, the second conduit extending generally parallel to the extrusion orifice of the die and defining an internal extrusion orifice generally parallel to the extrusion orifice of the die, the third conduit being in communication with the third supply means and the second conduit, the third conduit terminating within the second conduit at a location remote from the internal orifice defined by the second conduit, the termination of the third conduit being disposed within the second conduit generally remote from the internal wall of the second conduit.

Further features and advantages of the present invention will become more apparent from the following specification taken in connection with the drawing wherein.

Figure 1:
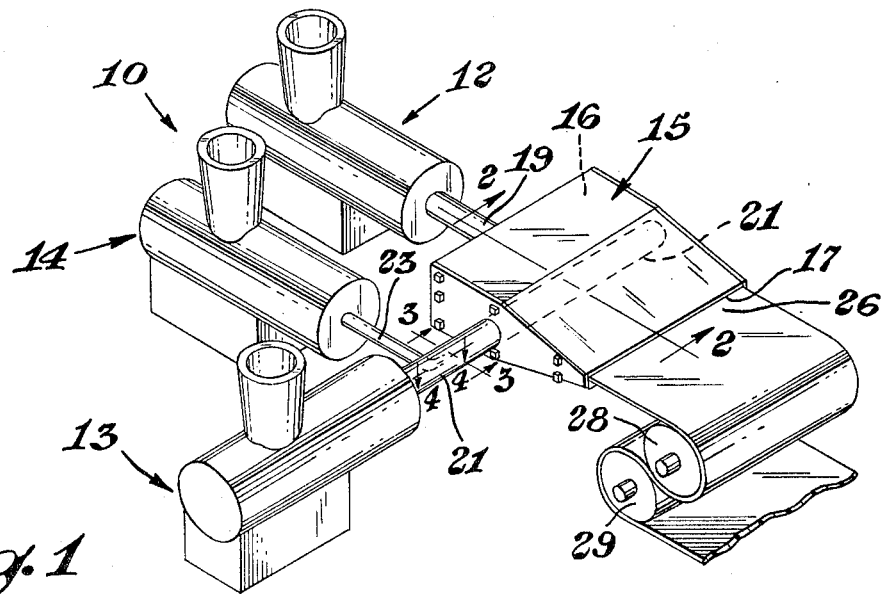
FIGURE 1 is a schematic, isometric representation of an apparatus in accordance with the invention.

In FIGURE 1 there is schematically illustrated an apparatus generally designated by the reference numeral 10 in accordance with the present invention. The apparatus 10 comprises a first extruder or heat-plastified stream supply means 12, a second extruder or heat-plastified stream supply means 13, a third extruder or heat-plastified stream supply means 14, a die 15 defining an internal cavity 16 and an extrusion orifice 17. The extrusion orifice 17 has an elongated configuration and is particularly adapted to extrude a sheet therefrom. A first conduit 19 provides communication between the extruder 12 and the internal cavity 16 of the die 15. A second conduit 21 provides communication between the cavity 16 and the extruder 13. The conduit 12 extends generally the entire width of the cavity 16. A third conduit 23 is in operative cooperation with the extruder 14 and the second conduit 21. A composite, theremoplastic sheet or film 26 is shown issuing from the extrusion orifice 17. A pair of processing rolls 28 and 29 serves to cool the sheet 26 below its thermoplastic temperature.

Figure 2:
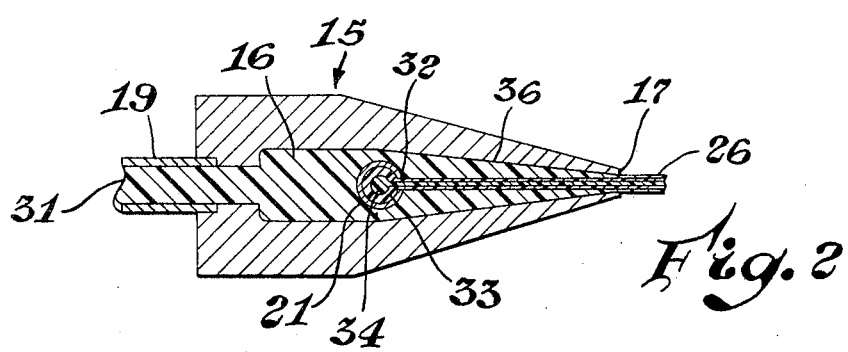
FIGURE 2 is a cross section of a die employed in FIGURE 1 taken along the line 2—2 thereof.

In FIGURE 2 there is illustrated a cross section of the die 15 taken aong the line 2—2 of FIGURE 1. The section depicts the relationship between the cavity 16 of the die 15, the conduit 19 remote from the extruder 12 which supplies a first heat-plastified stream 31 to the cavity 16 of the die 15 at a position remote from the extrusion orifice 17. Within the cavity 16 of the die 15 extends conduit 21 which defines an internal or second extrusion orifice 32 which is generally disposed remote from the terminal portion of the conduit 19 and adjacent to the extrusion orifice 17. The extrusion orifice 32 has a generally slot-like configuration and extends for generally about the entire width of the cavity 16 of the die 15. Within the conduit 21 is a second stream of heat-plastified, thermoplastic, resinous second stream 33 of a heat-plastified, resinous material and a third stream 34 of a third heat-plastified, synthetic, resinous material which is substantially enveloped within the second stream 33. The first stream 31, second stream 33, and third stream 34 unite to form a composite stream 36 which is subsequently extruded from the orifice 17 to form the composite film 26.

Figure 3:
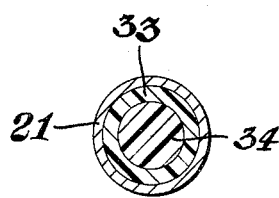
FIGURE 3 is a cross section of the apparatus of FIGURE 1 taken along the line 3—3.

In FIGURE 3 there is illustrated a cross-sectional view of the conduit 21 taken along the line 3—3 of FIGURE 1. FIGURE 3 shows the second stream 33 and the third stream 34 in substantially coaxial relationship with each other wherein the second stream 33 encloses or envelopes the third stream 34.

Figure 4:
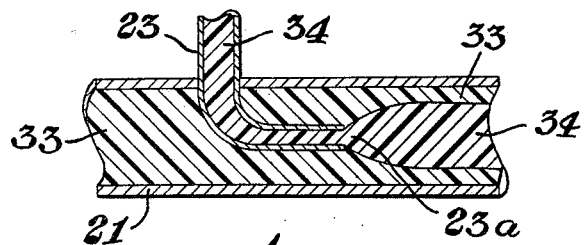
FIGURE 4 is a cross section of a portion of the apparatus of FIGURE 1 taken along the line 4—4.

In FIGURE 4 there is shown a sectional view of the conduits 21 and 23 of FIGURE 1 taken along the line 4—4 thereof. A second stream of heat-plastified, thermoplastic, resinous material 33 is disposed within the conduit 21. A third stream of heat-plastified, thermoplastic, resinous material 34 is disposed within the conduit 23. The terminal portion of the conduit 23 designated as 23a is disposed within the conduit 21 and is in spaced relationship to the walls thereof. The third stream 34 is discharged into the conduit 21 in such a manner that it is entirely enveloped by the second stream 33. In operation of the apparatus in accordance with FIGURE 1, a first thermoplastic, resinous stream is supplied by the extruder 12 which passes through conduit 19 into the cavity 16 of the die 15. Desirably in start-up of such an apparatus, the extruder 12 provides the first stream 31 to the cavity 16 and extrudes a one-component, nonlayered film until desired extrusion conditions are achieved, whereupon the extruder 13 is started providing the second stream 33 which, in the absence of the stream 34, will fill the conduit 21 and extrude from the orifice 32 in essentially a sheet-like configuration, and the resultant product is then a three-layer film or sheet consisting of composition 31, 34, 31. When its desired temperature is achieved, the extruder 14 is started, extruding a barrier material in heat-plastified condition as stream 34. The stream of heat-plastified material in the conduit 21 within the die 15 provides a two-component stream which is then extruded through the slot 32 in the manner illustrated in FIGURE 2, resulting in a five-layer film such as the film 26 of FIGURE 2. The resultant film is then cooled by suitable means such as the rolls 28 and 29 as illustrated in FIGURE 1. Beneficially, in the manipulation of thermoplastic, resinous materials of a corrosive nature, only the extruder 14 and the conduit 23 must be of corrosion-resistant material. If a corrosive material is employed for the stream 34, it is successfully isolated from the conduit 21 by the stream 33 and from the die 15 by the streams 31 and 33. By varying the relative output of the first, second, and third extruders, almost any desired relationship can be achieved in the dimensions of the layers of the resultant film. Generally, the extruders 12, 13 and the die 15 can be constructed from materials such as carbon steel which is suitable for use with polyolefins such as polyethylene, polypropylene, polystyrene and like relatively innocuous, extrudable, thermoplastic, resinous materials, whereas the barrel and screw of the extruder 14 as well as the conduit 23 desirably are constructed from materials such as stainless steel, nickel and like corrosion-resistant metals or metal alloys which are suitable for the particular material employed in the central layer or for the preparation of the stream 34.

In operation of the apparatus of the present invention, the critical extrusion temperature is that temperature which is most suitable for the outer layer of the composite stream 36 or the material of the stream 31. When suitable extrusion conditions are achieved for this material, the temperature employed for streams 33 and 34 may deviate widely from the single layer extrusion conditions generally recommended for such materials.

The usable temperature range for extrusion is oftentimes doubled and sometimes even tripled. However, generally the barrier or center layers such as the layer 34 is oftentimes of a halogenated material such as a saran, and for minimum decomposition and maximum desirable characteristics of the resultant product, it is usually beneficial to extrude such a material at the lowest possible temperature to minimize thermal degradation. The requirements for the central layer is that the material be extrudable within a sheath of another polymer and that the composition have the desired characteristics. Particularly advantageous and beneficial are extrudable compositions of vinylidene chloride polymers, wherein the polymers contain at least about 70 weight percent vinylidene chloride, the remainder being one or more olefinically unsaturated monomers copolymerizable therewith. Suitable vinylidene chloride copolymers are prepared utilizing such comonomers as methyl, ethyl, isobutyl, butyl, octyl and 2-ethylhexyl acrylates and methacrylates; phenyl methacrylate, cyclohexyl methacrylate, p-cyclohexylphenyl methacrylate, chloroethyl methacrylate, 2-nitro-2-methylpropyl methacrylate, and the corresponding esters of acrylic acid; methyl α-chloroacrylate, octyl α-chloroacrylate, methyl isopropenyl ketone, acrylonitrile, methacrylonitrile, methyl vinyl ketone, vinyl chloride, vinyl acetate, vinyl propionate, vinyl chloroacetate, vinyl bromide, styrene, vinyl naphthalene, ethyl vinyl ether, N-vinyl phthalimide, N-vinyl succinimide, N-vinyl carbazole, isopropenyl acetate, acrylamide, methacrylamide or monoalkyl substitution products thereof, phenylvinyl ketone, diethyl fumarate, diethyl maleate, methylene diethyl malonate, dichlorovinylidene fluoride, dimethyl itaconate, diethyl itaconate, dibutyl itaconate, vinyl pyridine, maleic anhydride, allyl glycidyl ether and other unsaturated aliphatic ethers described in U.S. Patent 2,160,943. These compounds may be described as vinyl or vinylidene compounds having a single $CH_2=C$ group. The most useful ones fall within the general formula

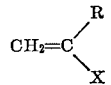

where R may be hydrogen, a halogen or a saturated aliphatic radical and X is selected from one of the following groups:

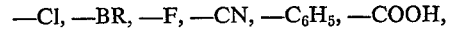

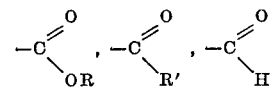

—$OC_6H_5$, —$CONH_2$, —CONH—R′, and —$CONR'_2$, in which R′ is alkyl.

Beneficially in the extrusion of the vinylidene polymers, it is frequently advantageous and beneficial to incorporate therein a minor portion of a plasticizer, oftentimes a heat stabilizer and a light stabilizer. Such additives are well known in the art and generally are found advantageous in that the temperature required for the extrusions substantially reduced and the probability of decomposition of the polymer in the extruder is lowered. Typical plasticizers which are employed in the vinylidene or saran combinations are acetyl tributyl citrate, epoxidized soyabean oil (commercially available under the trade designation of Paraplex G–60) and dibutyl sebacate. Commercially available light stabilizers may also be incorporated in the vinylidene chloride material such as tertiary-butyl salol. Other barrier compositions which may be used with benefit in films prepared by the apparatus of the present invention are vinyl chloride polymers which contain a predominant amount of vinyl chloride therein, and beneficially fluorocarbon polymers, fluorohydrocarbon polymers, fluorochalohydrocarbon polymers, such as polyvinyl chloride, polyvinylidene fluoride, chlorinated polyethylene and polymers of such materials as vinylidene fluoride, vinylidene fluoride and chlorotrifluoroethylene, vinylfluoride, chlorotrifulorethylene and vinylidene fluoride, chlorotrifluoroethylene and vinyl chloride, chlorotrifluoroethylene and vinylidene fluoride and tetrafluoroethylene and the like. Generally, for economic reasons, the vinylidene chloride polymers are employed as they are most readily available at relatively low cost.

Outer layers which are particularly desirable and beneficial are those prepared from polyethylene, polypropylene or the resinous copolymers of ethylene and propylene. Beneficial materials which are suitable for the intermediate layer or second stream are chlorinated polyethylene copolymers of from about 14 to 15 weight percent ethyl acrylate and from about 86 to 50 weight percent ethylene and from about 10 to about 40 weight percent vinyl acetate and 90 to 60 weight percent ethylene. Also useful is chlorinated polyethylene containing from about 20 to about 40 weight percent chlorine.

By way of further illustration employing an apparatus generally as illustrated in FIGURE 1, multi-layer films are prepared under conditions and at rates as set forth in the following tables:

In a manner similar to the foregoing illustration, other beneficial and advantageous composite films are readily prepared employing the apparatus of the present invention.

As is apparent from the foregoing specification, the apparatus of the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or limiting of the present invention.

What is claimed is:

1. An apparatus for the extrusion of a multilayer film

TABLE NO. 1.—EXTRUSION DATA ON 3 & 5 LAYER FILMS

| Sample No.: | Layer Composition | Thickness, mills | Plastic Temp., °C. | Die Temp., °C. | Rate, lbs./hr. | Chill Roll Temp., °C$_2$ |
|---|---|---|---|---|---|---|
| (8) | PE [2] | 1.70 | 190 | 215 | 174 | 80 |
|  | PEVAc [3] | 0.10 | 190 |  |  |  |
|  | Saran [1] | 0.42 | 140 |  |  |  |
|  | PEVAc [3] | 0.10 |  |  |  |  |
|  | PE [2] | 1.70 |  |  |  |  |
| (9) | PE [2] | 1.00 | 190 | 230 | 170 | 85 |
|  | PEVAc [3] | 0.10 | 200 |  |  |  |
|  | Saran [1] | 0.75 | 153 |  |  |  |
|  | PEVAc [3] | 0.10 |  |  |  |  |
|  | PE [2] | 1.00 |  |  |  |  |
| (10) | PE [2] | 1.65 | 190 | 225 | 160 | 85 |
|  | PEVAc [3] | 0.10 | 195 |  |  |  |
|  | Saran [1] | 0.50 | 144 |  |  |  |
|  | PEVAc [3] | 0.10 |  |  |  |  |
|  | PE [2] | 1.65 |  |  |  |  |
| (11) | PE [2] | 1.75 | 185 | 225 | 174 | 90 |
|  | PEVAc [3] | 0.15 | 200 |  |  |  |
|  | Saran [1] | 0.25 | 140 |  |  |  |
|  | PEVAc [3] | 0.15 |  |  |  |  |
|  | PE [2] | 1.75 |  |  |  |  |
| (12) | PE [2] | 0.65 | 190 | 225 | 160 | 87 |
|  | PEVAc [3] | 0.10 | 200 |  |  |  |
|  | Saran [1] | 0.50 | 145 |  |  |  |
|  | PEVAc [3] | 0.10 |  |  |  |  |
|  | PE [2] | 0.65 |  |  |  |  |
| (13) | PE [2] | 0.72 | 185 | 225 | 160 | 90 |
|  | PEVAc [3] | 0.10 | 200 |  |  |  |
|  | Saran [1] | 0.25 | 140 |  |  |  |
|  | PEVAc [3] | 0.10 |  |  |  |  |
|  | PE [2] | 0.72 |  |  |  |  |
| (19) | PE [2] | 1.09 |  |  |  |  |
|  | DS 204 [3] | 0.10 |  |  |  |  |
|  | Saran [1] | 0.61 |  | 325 |  |  |
|  | DS 204 [3] | 0.10 |  |  |  |  |
|  | PE [2] | 1.10 |  |  |  |  |
| (20) | PE [2] | 0.60 |  |  |  |  |
|  | DS 204 [3] | 0.10 |  |  |  |  |
|  | Saran [1] | 0.40 |  |  |  |  |
|  | DS 204 [3] | 0.10 |  |  |  |  |
|  | PE [2] | 0.60 |  |  |  |  |
| (21) | PE [2] | 1.14 |  |  |  |  |
|  | DS 204 [3] | 0.10 |  |  |  |  |
|  | Saran [4] | 0.52 | 162 | 200 |  | 180 |
|  | DS 204 [3] | 0.10 |  |  |  |  |
|  | PE [2] | 1.15 |  |  |  |  |
| (22) | PE [2] | 1.17 |  |  |  |  |
|  | DS 204 [3] | 0.10 |  |  |  |  |
|  | Saran [5] | 0.46 |  |  |  |  |
|  | DS 204 [3] | 0.10 |  |  |  |  |
|  | PE [2] | 1.17 |  |  |  |  |

[1] 93.75 parts by weight of a copolymer of 85 weight percent vinylidene chloride and 15 weight percent vinyl chloride, 4.50 parts by weight acetyltributyl citrate, 1.00 part by weight of an epoxidized soyabean oil commercially available under the trade designation of Paraplex G-60, 0.75 parts by weight of 4-tertiarybutyl salol.
[2] Polyethylene, density 0.930, Melt Index 3.8.
[3] Copolymer of 72 weight percent ethylene 28 weight percent vinyl acetate, Melt Index 3.0.
[4] 1 plus 2.25 parts by weight of acetyltributyl citrate.
[5] A copolymer of 85 weight percent vinylidene chloride and 15 weight percent vinyl chloride plasticized with 3 parts by weight per hundred parts by weight of copolymer of an epoxidized soyabean oil commercially available under a trade designation of Paraplex G-60.

No evidence of internal decomposition of the centrally disposed layer was observed in the preparation of the foregoing samples. No evidence of equipment corrosion was observed. Insofar as could be determined, the central and barrier layers were separated at all times by an outer layer of resin from the surface of the equipment in the downstream direction from the opening 23A of FIGURE 4.

wherein at least one layer of the film is a corrosive material under extrusion conditions, the apparatus comprising in cooperative combination means to supply a first stream of heat plastified thermoplastic resinous material, the means to supply the first stream being of a material unsuitable for the extrusion of a corrosive material, means to supply a second stream of a heat plastified thermoplastic resinous material, the means to supply the second stream being of a material unsuitable for the extrusion of a corrosive material, means to supply a third stream of heat plastified thermoplastic material, the third stream being a corrosive material, the means to supply the third stream being of a corrosion resistant material, a die defining an internal cavity and extrusion orifice, the die being of a material unsuited for the extrusion of a corrosive material, the extrusion orifice having a generally elongated configuration and adapted to extrude a sheet therefrom, a first conduit, a second conduit, the first and second conduits being of material unsuited for the extrusion of corrosive materials, and a third conduit, the third conduit being of corrosion resistant material, the first conduit providing communication between the first stream supply means and the internal cavity of the die, the second conduit providing communication between the second supply means and the internal cavity of the die, the second conduit extending within the internal cavity of the die generally parallel to the extrusion orifice of the die, the second conduit defining an extrusion orifice generally parallel and adjacent to the extrusion orifice of the die, the third conduit being in communication with the third supply means and the second conduit, the third conduit terminating within the second conduit at a location remote from the internal orifice defined by the second conduit, the third conduit being disposed within the second conduit and terminating a generally remote from the internal wall of the second conduit whereby the material of the third stream is carried within the material of the first and second streams through the die orifice without contacting the first or second conduits or the die.

2. The apparatus of claim 1 including means to cool material issuing from the extrusion orifice of the die below the thermoplastic temperature.

3. The apparatus of claim 1 wherein the extrusion orifice of the second conduit has an elongated like configuration.

4. The apparatus of claim 3 wherein the extrusion orifice of the second conduit extends substantially the entire width of the internal cavity of the die.

5. The apparatus of claim 1 wherein the third conduit is substantially coaxially disposed within the second conduit.

6. The apparatus of claim 1 wherein the means to supply streams of heat plastified thermoplastic material are extruders.

7. The apparatus of claim 1 wherein the die orifice has an elongate slot-like configuration adapted to extrude film or sheet.

References Cited
UNITED STATES PATENTS

| | | |
|---|---|---|
| 2,408,398 | 10/1946 | Johnson. |
| 3,241,503 | 3/1966 | Schafer. |
| 3,274,646 | 9/1966 | Krystof. |
| 3,321,804 | 5/1967 | Breidt et al. |

WILLIAM J. STEPHENSON, Primary Examiner

U.S. Cl. X.R.

18—47